United States Patent [19]

Meier et al.

[11] Patent Number: 5,125,383
[45] Date of Patent: Jun. 30, 1992

[54] MOUNTING ARRANGEMENT FOR A FUEL INJECTION PUMP NOZZLE IN A CYLINDER HEAD

[75] Inventors: Christoph Meier, Weinstadt; Helmut Werthmann, Braunschweig-Bevenrode, both of Fed. Rep. of Germany

[73] Assignee: Volkswagen AG, Fed. Rep. of Germany

[21] Appl. No.: 730,432

[22] Filed: Jul. 16, 1991

[30] Foreign Application Priority Data

Jul. 18, 1990 [DE] Fed. Rep. of Germany ....... 4022797

[51] Int. Cl.$^5$ .................. F02M 55/02; F02M 37/04
[52] U.S. Cl. .................... 123/470; 123/509
[58] Field of Search .............. 123/468, 469, 470, 507, 123/508, 509

[56] References Cited

U.S. PATENT DOCUMENTS

| | | | |
|---|---|---|---|
| 2,858,815 | 11/1958 | Burrows et al. | 123/470 |
| 3,431,895 | 3/1969 | Bailey | 123/470 |
| 3,845,748 | 11/1974 | Eisenberg | 123/468 |
| 3,924,583 | 12/1975 | Jardin | 123/469 |
| 4,206,725 | 6/1980 | Jenkel et al. | 123/470 |
| 4,384,557 | 5/1983 | Johnson | 123/468 |
| 4,422,426 | 12/1983 | Tsugekawa et al. | 123/470 |
| 4,522,182 | 6/1985 | Mowbray | 123/470 |
| 4,602,604 | 7/1986 | Kauer | 123/508 |
| 4,615,323 | 10/1986 | LeBlanc et al. | 123/470 |
| 5,007,401 | 4/1991 | Grohn et al. | 123/470 |

FOREIGN PATENT DOCUMENTS

| | | |
|---|---|---|
| 3928104 | 3/1990 | Fed. Rep. of Germany . |
| 0025035 | 2/1984 | Japan .................. 123/470 |

Primary Examiner—Tony M. Argenbright
Assistant Examiner—Thomas N. Moulis
Attorney, Agent, or Firm—Brumbaugh, Graves, Donohue & Raymond

[57] ABSTRACT

In the embodiment described in the specification, a fuel injection pump nozzle which is received in a recess in a cylinder head is mounted on the cylinder head by a flange which engages a bearing surface on the surface of the cylinder head surrounding the recess. This prevents application of mounting forces to the sealing contact surface in the cylinder head recess, thereby avoiding critical stresses in the region of the cylinder head near the combustion chamber.

2 Claims, 2 Drawing Sheets

MOUNTING ARRANGEMENT FOR A FUEL INJECTION PUMP NOZZLE IN A CYLINDER HEAD

BACKGROUND OF THE INVENTION

This invention relates to arrangements for mounting a fuel injection pump nozzle in the cylinder head of an internal combustion engine.

German Offenlegungsschrift No. 39 28 104 discloses a mounting for a pump nozzle which is actuated by a pivoted bell crank having a bearing which is integral with the pump nozzle housing. This integral bearing arrangement avoids the elasticity which often exists in the operation of a pump nozzle having a conventional bell crank pivot bearing which is separate from the pump nozzle housing. However, it produces an undesirable effect on the portion of the cylinder head forming the sealing surface with the pump when the pump housing is supported in the usual manner by engagement between a shoulder forming an inelastic metal seal and the sealing contact surface of the cylinder head. This may result in flow of the cylinder head material, particularly when the head is made of aluminum. Such flow of the material in the seat formed in the cylinder head may result in an uncertainty of the location of the pump nozzle ejection orifices and hence in an adverse effect on the ignition behavior of the engine in the adjacent region of the combustion chamber.

SUMMARY OF THE INVENTION

Accordingly, it is an object of the present invention to provide a new and improved mounting arrangement for a fuel injection pump nozzle in a cylinder head which overcomes the above-mentioned disadvantages of the prior art.

Another object of the invention is to provide a simple and effective fuel injection nozzle mount that will avoid undesirable effects on critical portions of the cylinder head.

These and other objects of the invention are attained by providing a fuel injection nozzle which is received in a recess in a cylinder head and has a projecting mounting flange which engages the cylinder head outside the recess, along with a resilient gas seal between the nozzle and the cylinder head within the recess.

According to the invention, therefore, the axial support for the nozzle is not located at the contact sealing surface between the nozzle and the cylinder head within the recess, but instead is at a bearing surface on the cylinder head outside the recess to receive the mounting flange for the pump nozzle. The flange-receiving bearing surface is located in the region of the cylinder head adjacent to the camshaft which is insensitive to applied stress. In addition, the size of the supporting areas for the attachment flange and the bearing surface can be quite large compared to the region of the nozzle contact sealing surface within the recess. Consequently, critical stresses are avoided. Another advantage of the invention is that, because an elastic gas seal can be used, greater tolerances between the nozzle and the recess are possible.

An especially favorable design with regard to the avoidance of undesirable stress flows is one which provides for integration of the pivot of the injection pump bell crank with the injection pump nozzle so that force is transmitted directly from the pivot to the nozzle.

BRIEF DESCRIPTION OF THE DRAWING

Further objects and advantages of the invention will be apparent from a reading of the following description in conjunction junction with the accompanying drawings, in which.

DESCRIPTION OF PREFERRED EMBODIMENT

Figure 1:
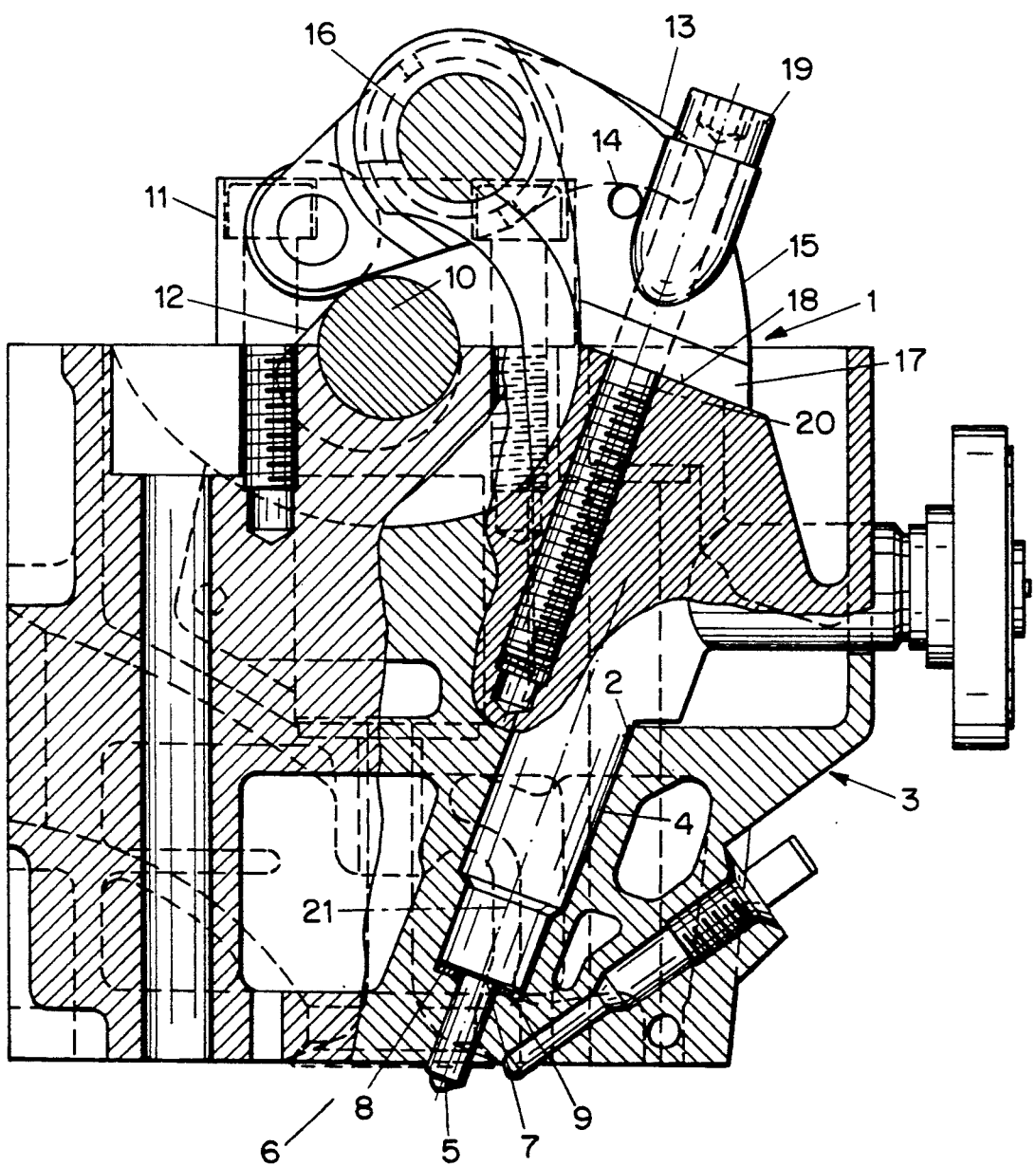
FIG. 1 is a vertical sectional view illustrating a representative mounting arrangement for a fuel injection pump nozzle installed in a cylinder head in accordance with the invention.
Figure 2:
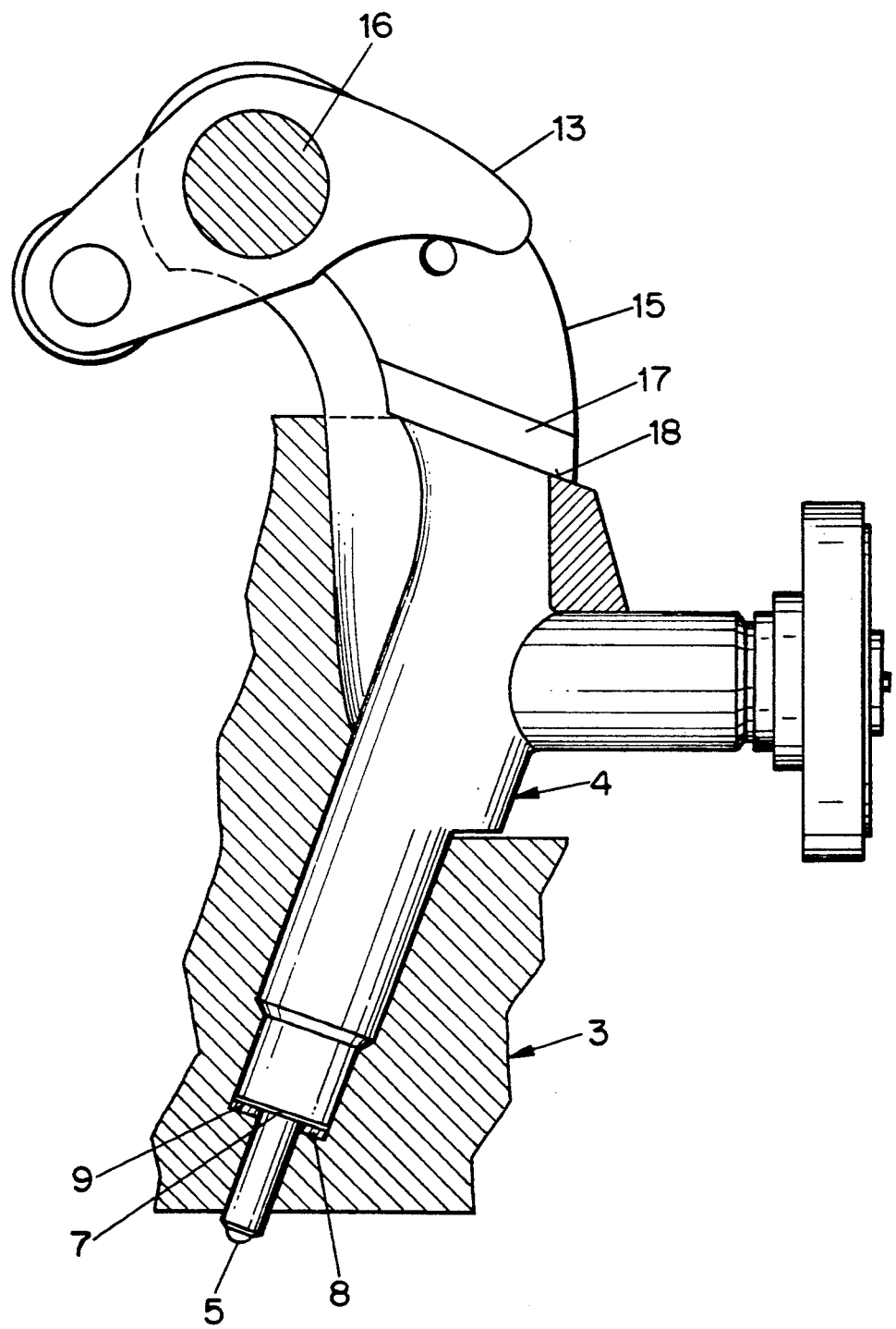
FIG. 2 is a view similar to FIG. 1 illustrating the engagement of the fuel injection mounting flange with the cylinder head and the pivot support for the bell crank mounted on the fuel injection nozzle.

In the typical embodiment of the invention shown in the drawing, a pump nozzle 1, having a structure which is known and therefore not shown, has a housing 4 which projects into a recess 2 of a cylinder head 3. The housing 4 contains the essential active parts of the pump nozzle as well as a tip 5, provided with injection orifices, which projects into a combustion chamber 6 of an internal combustion engine. A shoulder 7 formed on the housing of the pump nozzle 1 is closely spaced from a sealing contact surface 9 at the bottom of the recess 2 with a resilient seal 8 sealing the space between the shoulder and the contact surface.

The pump nozzle 1 is driven by a camshaft 10 supported on the cylinder head 3 by a bearing block 11 which is secured by screws to the top surface of the cylinder head 3. The motion of a cam 12 is transmitted by a bell crank 13 to a roller pin 14 of the pump nozzle 1 in the usual manner. Two parallel lugs enclose the bell crank between them on the housing of the pump nozzle 1, of which only the one designated by 15 is visible in the drawing. These lugs, which form the bearing for a pivot 16 for the bell crank 13, are integral with a mounting flange 17 for the pump nozzle 1 so that forces acting upon the lugs are transmitted directly into the pump nozzle 1.

The portion of the pump nozzle 1 located outside the recess 2 at the level of the camshaft 10 includes the mounting flange 17 which extends perpendicular to the centerline of the pump nozzle 1. When the pump nozzle is installed in the cylinder head 3 as shown in the drawing, the mounting flange is held directly on a contact surface 18 formed on the cylinder head. This contact surface and the facing surface of the mounting flange 17 can thus be made comparatively large without interfering with space for cooling passages, accommodation of valve guides and the like in the cylinder head 3.

The distance between the contact surface 18 on the one hand and the sealing surface 9 on the other hand is selected so that the pump nozzle 1 is supported in the axial direction by the contact surface 18, and not by the sealing surface 9. Consequently, the critical region of the cylinder head 3 around the surface 9 is not subjected to any stress. Thus, the seal 9 can be merely an elastic gas seal, and not, as in prior art mounting arrangements, a comparatively rigid metal seal consisting, for example, of copper and designed so that the pump nozzle 1 is supported on the contact sealing surface 9 by way of the seal.

The flange 17 is provided with holes for attachment screws 19 which extend parallel to the axis 21 of the pump nozzle housing 4. As may be seen immediately from the drawing, the axes 20 of the attachment screws are slightly offset toward the pivot 16 from the axis 21 of the pump nozzle 1. This tends to counteract the effect of moments exerted on the pivot 16 by the cam 12.

The invention thus provides a simple mounting arrangement for an injection nozzle that avoids undesirable stresses on critical regions of the cylinder head.

Although the invention has been described herein with reference to a specific embodiment, many modifications and variations therein will readily occur to those skilled in the art. Accordingly, all such variations and modifications are included within the intended scope of the invention.

We claim:

1. A mounting arrangement for a fuel injection pump nozzle having a nozzle tip on a cylinder head comprising a cylinder head having a recess to receive the fuel injection pump nozzle with the nozzle tip projecting into a combustion chamber and having a sealing contact surface therein adjacent to the combustion chamber, the fuel injection pump nozzle having a shoulder within the cylinder head recess, a resilient gas seal between the shoulder and the sealing contact surface, a mounting flange on the fuel injection pump nozzle disposed outside the recess, and a bearing surface on the cylinder head outside the recess to support the mounting flange of the fuel injection pump nozzle so that axial stresses on the sealing contact surface are avoided.

2. A mounting arrangement for a fuel injection pump nozzle on a cylinder head comprising a cylinder head having a recess to receive the fuel injection pump nozzle and having a sealing contact surface therein, the fuel injection pump nozzle having a shoulder within the cylinder head recess, a resilient gas seal between the shoulder and the sealing contact surface, a mounting flange on the fuel injection pump nozzle disposed outside the recess, and a bearing surface on the cylinder head outside the recess to support the mounting flange of the fuel injection pump nozzle so that axial stresses on the sealing contact surface are avoided, including a pivotally mounted bell crank for actuating the fuel injection pump nozzle and a pivot support for the bell crank which is mounted directly on the pump nozzle.

* * * * *